April 10, 1934.                M. HOWALD                1,954,047
ROTARY LOCKING APPARATUS
Filed Sept. 21, 1929          3 Sheets-Sheet 2

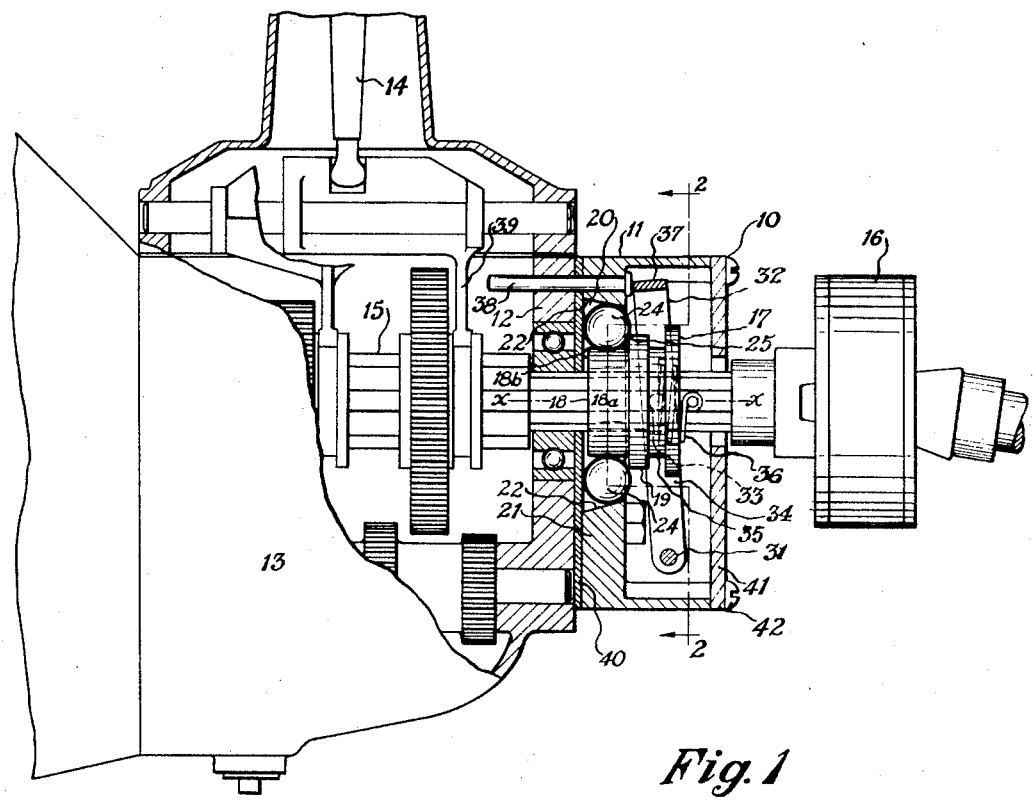

Inventor
Melville Howald
By Harry Frease
Attorney

April 10, 1934. M. HOWALD 1,954,047
ROTARY LOCKING APPARATUS
Filed Sept. 21, 1929 3 Sheets-Sheet 3

Inventor
Melville Howald
By Frease and Bishop
Attorneys

Patented Apr. 10, 1934

1,954,047

UNITED STATES PATENT OFFICE 1,954,047

ROTARY LOCKING APPARATUS

Melville Howald, Massillon, Ohio

Application September 21, 1929, Serial No. 394,291

6 Claims. (Cl. 192—4)

My invention relates to rotary locking apparatus more particularly for use as a safety brake in an automobile to prevent the automobile from rolling backward on a hill or an incline when the automobile has been stopped on the hill and the gear shift and transmission is in one of the forward speed positions or in neutral.

The invention is applicable however to any machinery where it is desired to lock a rotatable member to another member, or to any reversing machinery in which it is desired to prevent reverse rotation of a shaft excepting under the control of the operator.

Greater safety in operation of automobiles or other machinery is attained by the use of such safety brakes or clutches.

As heretofore designed, however, safety brakes intended for the automotive uses, have frequently failed to operate with sufficient rapidity to prevent the automobile attaining a backward momentum which could not be overcome.

On the other hand, when shifting the gears into reverse it is necessary to render the safety brake inoperative in order that the drive shaft may turn in the reverse direction, and when a conscious effort of the automobile driver is required for rendering a safety clutch inoperative, accidents very frequently occur.

Accordingly the objects of the present improvements include the provision of a novel rotary locking apparatus, preferably comprising a safety brake for automotive use in which the gripping and release is substantially instantaneous at the desired time, and which includes control means for rendering the brake automatically inoperative when the transmission is shifted to a reverse position.

These and other objects are attained in the present invention, as will hereinafter be set forth in greater detail, and claimed.

Figure 3:
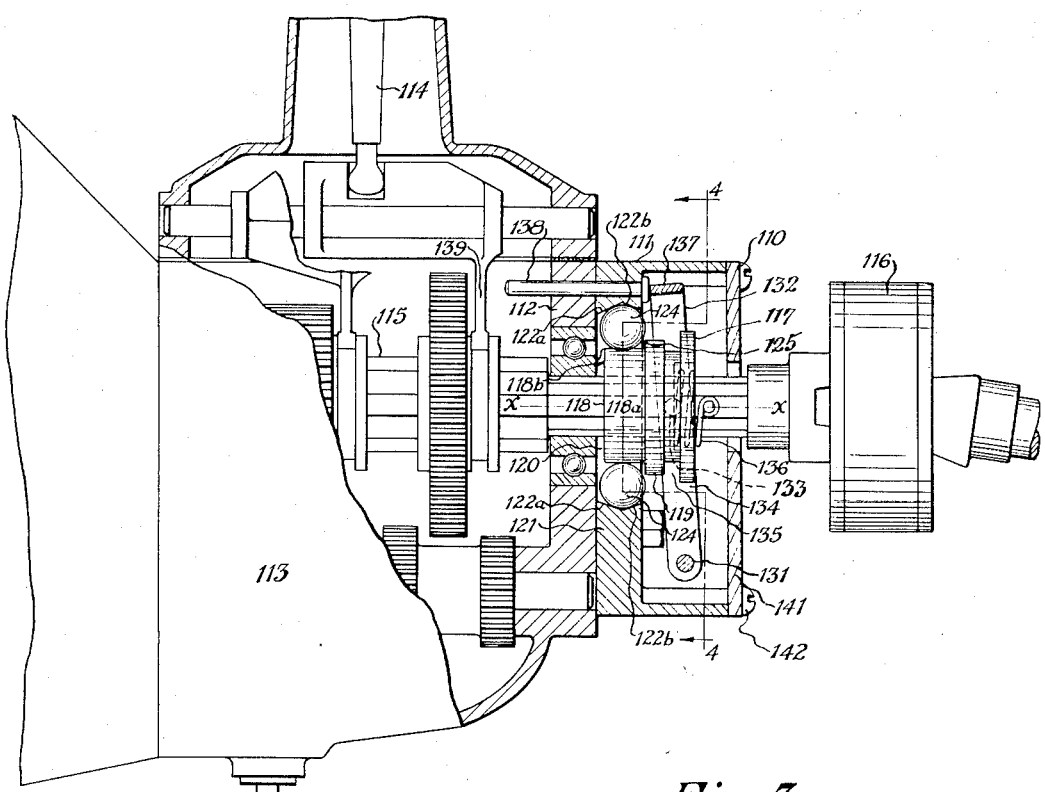
Figure 4:
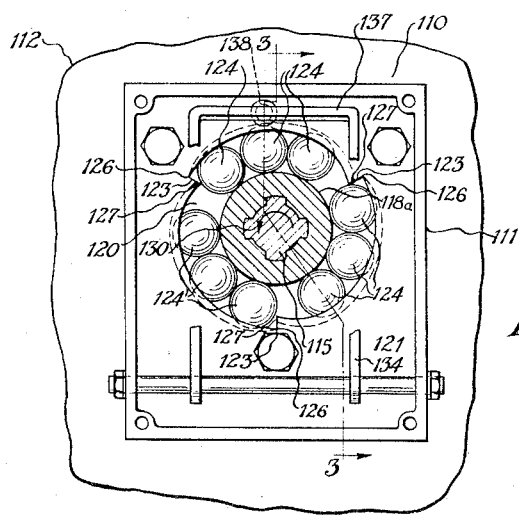
Figure 5:
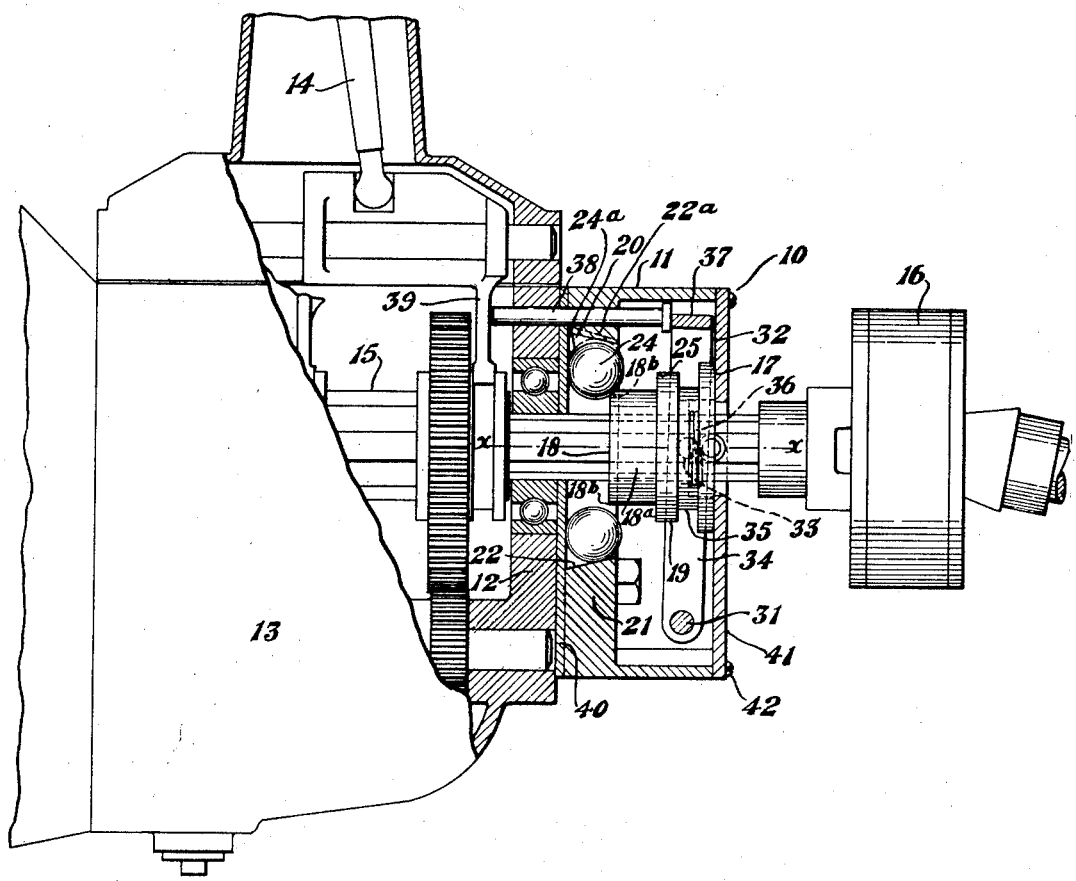

Preferred embodiments of the improvements are illustrated in the accompanying drawings forming part hereof, in which Figure 1 is a longitudinal sectional view of one embodiment of the improved rotary locking apparatus in the form of a safety brake in combination with the transmission of an automobile, as on line 1—1, Fig. 2;

Fig. 2, a transverse sectional view thereof as on line 2—2, Fig. 1;

Fig. 3, a view similar to Fig. 1 illustrating a modified embodiment of the invention in the form of another improved safety brake, as on line 3—3, Fig. 4; and Fig. 4, a transverse sectional view thereof as on line 4—4, Fig. 3; and Fig. 5, a view similar to Fig. 1 showing the relative positions of the parts when the transmission gears are meshed for reverse movement.

Similar numerals refer to similar parts throughout the several views.

The embodiment of the improved rotary locking apparatus in the form of a safety brake in combination with the transmission of an automobile indicated generally at 10 in Figs. 1, 2 and 5, may include a case 11 which may be secured upon the rear wall 12 of a transmission housing 13 of an automobile or the like.

The transmission housing mounts in any usual manner, gear sets for attaining one or more forward speeds and a reverse, and the gear sets may be actuated in a usual manner by a gear shift lever 14.

The transmission includes a power take-off shaft 15 to which the several forward and reverse rotary speeds are imparted, and which extends through the rear wall 12. The shaft 15 may be preferably splined as illustrated, and extends through the case 11 at the rear of which the shaft 15 may be connected through a universal joint 16 with the usual intermediate shaft, rear universal joint, and rear axle differential drive of an automobile, not shown.

An internally splined inner member in the form of a sleeve 17 is slidably mounted on the splined shaft 15 within the case 11.

The end 18 of the sleeve adjacent the transmission housing is preferably hardened, and its outer surface 18a is preferably cylindric.

A ball thrust flange 19 extends outwardly from the central portion of the sleeve 17.

The hardened end 18 of the sleeve extends into a raceway opening or socket 20 formed in an outer member, which as illustrated is the wall 21 of the case 11 abutting the wall 12 of the transmission housing.

The circumference of the inner surface of the raceway opening opposite the outer cylindric sleeve surface 18a preferably includes three successive angled and spiraled inner raceways 22, each raceway preferably intercepting a central angle of 120°.

It has been discovered by experiment that the brake 10 operates most satisfactorily when the total number of angled and spiraled raceways comprising the circumference of the raceway opening is three.

Adjacent ends of the spiral raceways are preferably connected with each other by radial surfaces 23.

A set of at least two balls 24 is interposed between each raceway and the sleeve.

When the brake 10 is in operative position, each ball contacts radially with the cylindric surface 18a; and the adjacent corner shoulder 25 of the thrust flange 19, rolling against the balls prevents the end of the sleeve 18 adjacent the transmission wall 12 from bearing against the wall.

Each raceway as aforesaid is angled or tapered and spiraled with respect to the longitudinal axis X—X of the shaft 15, and the apex of the angle or taper is located in the direction of the universal joint 16.

Commencing at the end 26 of each spiral furthest removed radially from the axis X—X of the shaft, the surface of each raceway is differentially tapered when measured by its trace on any plane passing through the axis X—X of the shaft, the trace making an angle of zero with the longitudinal axis X—X at each end 26 and increasing to substantially 20° in a plane angularly removed from the end 26 by a distance of substantially the angle intercepted by two of the balls 24, and the angle of the trace with the axis X—X then preferably decreases to substantially 10° at the end 27 of the spiral raceway surface radially nearest the axis X—X.

In the embodiment 10, compression springs 28 each react between a suitable stop 29 in the case 11 and the ball 24 of each set at the end of the raceway furthest removed radially from the axis X—X, whereby each spring 28 applies a force on its set of balls tending to move them away from the radial surfaces 23.

The normal rotation of the shaft 15 for forward movement of the automobile is in the direction of the arrow 30.

As long as the shaft rotates in this direction, the shaft tends to carry or roll the balls with it and out of engagement with the tapered and spiraled raceways.

If the automobile is stopped on a hill or incline and headed upwards, the weight of the car, unless the brakes are applied, tends to move it rearwardly down hill and thus to impart a rotation to the shaft 15 reverse in direction to that of the arrow 30.

When the shaft 15 is thus rotated reversely through a substantially imperceptible angle, the balls of the several sets are carried in that direction and make a wedge locking engagement between the radial contact with the sleeve and the radial and thrust point contact against the angled and spiraled raceway surfaces, thus automatically braking the automobile against rearward movement.

The specified relationship of these surfaces is such that the desired braking engagement of the brake 10 to prevent reverse rotation of the shaft, is substantially instantaneous.

When, however, power is applied to the shaft for again rotating it in the direction of the arrow 30, the wedge engagement of the raceway surfaces and the sleeve with the balls is broken substantially instantaneously.

To enable a desired reverse rotation of the shaft 15, a transverse shaft 31 is mounted in the case below the power take-off shaft 15, and a yoke 32 is pivotally mounted on the transverse shaft, the yoke engirdling the sleeve and including pins 33 extending inwardly from the side members 34 of the yoke into sliding engagement with an annular groove 35 formed in the end of the sleeve adjacent the universal joint 16.

A compression spring 36 urges the sleeve towards the transmission housing, whenever the sleeve is moved from the normal position illustrated in Fig. 1, towards the universal joint 16.

During normal rotation of the shaft in the direction of the arrow 30, the ball action is substantially that of the action of a ball bearing.

A transverse bar 37 extends between the upper ends of the yoke side members, and abuts against one end of a slide pin 38 mounted in a suitable aperture in the wall 21 of the case 11 for sliding in a direction parallel with the shaft axis X—X.

The other end of the slide pin 38 is adapted for impingement by the reverse gear slide tongue 39 which is slidably mounted in the transmission housing, and which is normally maintained in the position illustrated in Fig. 1, and is moved towards the case 11 when the gear shift lever is moved to set the gears for reversing, as shown in Fig. 5 thereby swinging the yoke towards the universal joint 16, and sliding the sleeve 18 away from the transmission housing so that the contact with the cylindric surface 18a is broken and the balls drop over the end shoulder 18b of the sleeve towards the axis X—X to the position illustrated in Fig. 5, in which position wedge engagement of the balls with the sleeve and the raceways is not possible.

When the gear shift lever is returned to normal position, unmeshing the reverse gears, the spring 36 acts to return the sleeve 18 to the position shown in Fig. 1, and the end shoulder 18b being below the axis of the balls will cause the balls to roll up onto the cylindric surface 18a into normal operating position.

The distance between the dot-dash circle 24a and the dotted line 22a represents the true clearance between a ball which has dropped over the end shoulder 18b and the raceway 22.

A thrust plate 40 is preferably interposed between the case 11 and the transmission housing 13 for providing the thrust reaction on the transmission side of the balls, the taper of the raceways providing the thrust reaction in the opposite direction.

It is preferable to form the thrust plate 40 separate from the case 11 in order to permit easier machining of the raceways, although it is obvious that the thrust plate and clutch case may be made in one piece.

For similar reasons, the case is preferably provided with a removable cover plate 41 at its outer end which is secured to the case as by means of screws 42.

The thrust reactions on the balls are primarily for maintaining the alinement of the balls, the principal wedging reactions on the balls being radial.

The embodiment of the improved rotary locking apparatus in the form of another safety brake in combination with the transmission of an automobile indicated generally at 110 in Figs. 3 and 4, may include a case 111 which may be secured upon the rear wall 112 of a transmission housing 113 of an automobile or the like.

The transmission housing mounts in any usual manner, gear sets for attaining one or more forward speeds and a reverse, and the gear sets may be actuated in a usual manner by a gear shift lever 114.

The transmission includes a power take-off shaft 115 to which the several forward and reverse rotary speeds are imparted, and which extends through the rear wall 112. The shaft 115 may be preferably splined as illustrated, and extends through the case 111 at the rear of which the shaft 115 may be connected through a universal joint 116 with the usual intermediate shaft, rear universal joint, and rear axle differential drive of an automobile, not shown.

An internally splined inner member in the form of a sleeve 117 is slidably mounted on the splined shaft 115 within the case 111.

The end 118 of the sleeve adjacent the transmission housing is preferably hardened, and its outer surface 118a is preferably cylindric.

A ball thrust flange 119 extends outwardly from the central portion of the sleeve 117.

The hardened end 118 of the sleeve extends into a raceway opening or socket 120 formed in an outer member, which as illustrated is the wall 121 of the case 111 abutting the wall 112 of the transmission housing.

The circumference of the inner surface of the raceway opening opposite the outer cylindric sleeve surface 118a preferably includes three sets of successive oppositely angled and spiraled inner raceways 122a and 122b, each set of raceways preferably intercepting a central angle of 120°.

It has been discovered by experiment that the brake 110 operates most satisfactorily when the total number of sets of angled and spiraled raceways comprising the circumference of the raceway opening is three.

Adjacent ends of the spiral raceways are preferably connected with each other by radial surfaces 123.

A set of at least three balls 124 is interposed between each raceway and the sleeve.

When the brake 110 is in operative position, each ball contacts radially with the cylindric surface 118a; and the adjacent corner shoulder 125 of the thrust flange 119, rolling against the balls prevents the end of the sleeve 118 adjacent the transmission wall 112 from bearing against the wall.

Each raceway as aforesaid is angled or tapered and spiraled with respect to the longitudinal axis X—X of the shaft 115, and the apex of the angle or taper of each raceway 122a is located in the direction of the transmission, and the apex of the angle or taper of each raceway 122b is located in the direction of the universal joint 116.

Commencing at the end 126 of each double angled spiral, furthest removed radially from the axis X—X of the shaft, the surface of each raceway is differentially tapered when measured by its trace on any plane passing through the axis X—X of the shaft, the trace making an angle of zero with the longitudinal axis X—X at each end 126 and increasing to substantially 20° in a plane angularly removed from the end 126 by a distance of substantially the angle intercepted by two of the balls 124, and the angle of the trace with the axis X—X then preferably decreases to substantially 10° at the end 127 of the spiral raceway surface radially nearest the axis X—X.

The normal rotation of the shaft 115 for forward movement of the automobile is in the direction of the arrow 130.

As long as the shaft rotates in this direction, the shaft tends to carry or roll the balls with it and out of engagement with the tapered and spiraled raceways.

If the automobile is stopped on a hill or incline and headed upwards, the weight of the car, unless the brakes are applied, tends to move it rearwardly down hill and thus to impart a rotation to the shaft 115 reverse in direction to that of the arrow 130.

When the shaft 115 is thus rotated reversely through a substantially imperceptible angle, the balls of the several sets are carried in that direction and make a wedge locking engagement between the radial contact with the sleeve and the radial and thrust point contacts against the double angled and spiraled raceway surfaces, thus automatically braking the automobile against rearward movement.

The specified relationship of these surfaces is such that the desired braking engagement of the brake 110 to prevent reverse rotation of the shaft, is substantially instantaneous.

When, however, power is applied to the shaft for again rotating it in the direction of the arrow 130, the wedge engagement of the raceway surfaces and the sleeve with the balls is broken substantially instantaneously.

To enable a desired reverse rotation of the shaft 115, a transverse shaft 131 is mounted in the case below the power take-off shaft 115, and a yoke 132 is pivotally mounted on the transverse shaft, the yoke engirdling the sleeve and including pins 133 extending inwardly from the side members 134 of the yoke into sliding engagement with an annular groove 135 formed in the end of the sleeve adjacent the universal joint 116.

A compression spring 136 urges the sleeve towards the transmission housing, whenever the sleeve is moved from the normal position illustrated in Fig. 3, towards the universal joint 116.

During normal rotation of the shaft in the direction of the arrow 130, the ball action is substantially that of the action of a ball bearing.

A transverse bar 137 extends between the upper ends of the yoke side members, and abuts against one end of a slide pin 138 mounted in a suitable aperture in the wall 121 of the case 111 for sliding in a direction parallel with the shaft axis X—X.

The other end of the slide pin 138 is adapted for impingement by the reverse gear slide tongue 139 which is slidably mounted in the transmission housing, and which is normally maintained in the position illustrated in Fig. 3, and is moved towards the case 111 when the gear shift lever is moved to set the gears for reversing, thereby swinging the yoke towards the universal joint 116, and sliding the sleeve 118 away from the transmission housing so that the contact with the cylindric surface 118a is broken and the balls drop over the end shoulder 118b of the sleeve towards the axis X—X in the same manner as in the embodiment illustrated in Figs. 1, 2 and 5, in which position wedge engagement of the balls with the sleeve and the raceways is not possible.

The case is preferably provided with a removable cover plate 141 at its outer end which is secured to the case as by means of screws 142.

In the safety brake embodiment 110 of the invention, alinement of the balls is attained by the use of the double angled raceways, and the wedging engagement of the balls is attained by the spiral form of the raceways.

In both the safety brake embodiments 10 and 110 of the invention, the balls are circumferentially alined and prevented from moving longitudinally of the axes X—X.

In the embodiment 10 the springs 28, and in the embodiment 110, the third ball of each set adjacent the radial surfaces 123, permit just enough clearance between the sleeves and the raceways to permit rotation of the shafts in the direction of the arrows, and at the same time maintain the balls at the other ends of the spiral raceways in position to be immediately wedged by a substantially imperceptible rotation of the shafts in the opposite direction.

In each embodiment the outer cylindric surface of the sleeve forms a cylindric raceway for the balls.

I claim:

1. Rotary locking apparatus including an inner member having an outer raceway formed thereon, and an outer member having an inner raceway formed thereon, rolling members interposed between the raceways, the raceway of one member being cylindric, and the raceway of the other member being spiralled and angled with respect to an axis of rotation of the member having the cylindric raceway.

2. Rotary locking apparatus including an inner member having an outer raceway formed thereon, and an outer member having an inner raceway formed thereon, balls interposed between the raceways, the raceway of one member being cylindric, and the raceway of the other member being spiralled and angled with respect to an axis of rotation of the member having the cylindric raceway.

3. Rotary locking apparatus including an inner member having an outer raceway formed thereon, and an outer member having an inner raceway formed thereon, rolling members interposed between the raceways, the raceway of one member being cylindric, the raceway of the other member being spiralled and angled with respect to an axis of rotation of the member having the cylindric raceway, and means for selectively moving one of the members in opposite directions lengthwise of said axis of rotation.

4. Rotary locking apparatus including an inner member having an outer raceway formed thereon, and an outer member having an inner raceway formed thereon, balls interposed between the raceways, the raceway of one member being cylindric, the raceway of the other member being spiralled and angled with respect to an axis of rotation of the member having the cylindric raceway, and means for selectively moving one of the members in opposite directions lengthwise of said axis of rotation.

5. In combination with power transmission mechanism including a drive shaft, a rotary locking apparatus including an inner member slidably keyed on the drive shaft, the inner member having a cylindric outer surface providing an outer raceway, a fixed outer member provided with an inner raceway spiraled and angled with respect to the axis of the drive shaft, and balls rolling in the raceways, whereby rotation of the drive shaft in one direction is normally prevented.

6. In combination with power transmission mechanism including a drive shaft, a rotary locking apparatus including an inner member slidably keyed on the drive shaft, the inner member having a cylindric outer surface providing an outer raceway, a fixed outer member provided with an inner raceway spiraled and angled with respect to the axis of the drive shaft, and balls rolling in the raceways, whereby rotation of the drive shaft in one direction is normally prevented, and means operated by the transmission mechanism operating means for selectively moving the inner member longitudinally of the drive shaft for permitting rotation of the drive shaft in either direction.

MELVILLE HOWALD.